United States Patent
Ou et al.

(10) Patent No.: US 8,282,063 B2
(45) Date of Patent: Oct. 9, 2012

(54) HOLDER

(75) Inventors: Tsung-Yuan Ou, Taoyuan County (TW); Chih-Wei Tai, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 353 days.

(21) Appl. No.: 12/421,645

(22) Filed: Apr. 10, 2009

(65) Prior Publication Data
US 2010/0181455 A1   Jul. 22, 2010

(30) Foreign Application Priority Data
Jan. 20, 2009 (TW) ................... 98102037 A

(51) Int. Cl.
*A47G 1/00* (2006.01)
(52) U.S. Cl. ............ 248/346.04; 248/316.3; 248/316.4; 248/316.6; 248/316.8
(58) Field of Classification Search ............ 248/316.1, 248/316.3, 316.4, 316.6, 309.1, 346.04, 176.3, 248/292.13, 298.1, 346.03
See application file for complete search history.

(56) References Cited

U.S. PATENT DOCUMENTS

| | | | |
|---|---|---|---|
| 5,187,744 A * | 2/1993 | Richter | 379/449 |
| 5,832,082 A | 11/1998 | Nagai | |
| 5,836,563 A * | 11/1998 | Hsin-Yung | 248/316.4 |
| 5,947,359 A * | 9/1999 | Yoshie | 224/570 |
| 6,229,891 B1 | 5/2001 | Chen | |
| 6,438,229 B1 | 8/2002 | Overy et al. | |
| 6,785,567 B2 * | 8/2004 | Kato | 455/575.9 |
| 6,944,294 B2 * | 9/2005 | Tsay | 379/446 |
| 7,418,097 B2 * | 8/2008 | Chang | 379/446 |
| 2007/0262223 A1 * | 11/2007 | Wang et al. | 248/346.07 |

FOREIGN PATENT DOCUMENTS

EP   1973313   9/2008

OTHER PUBLICATIONS

"Search report of Europe counterpart application", issued on Jul. 9, 2009, p. 1-p. 3.

* cited by examiner

*Primary Examiner* — Terrell McKinnon
*Assistant Examiner* — Steven Marsh
(74) *Attorney, Agent, or Firm* — Jianq Chyun IP Office

(57) ABSTRACT

A holder includes a base, a first carriage, a first elastic module, a second carriage, a second elastic module, and two clamping mechanisms. When a handheld electronic device is installed in the holder, the second carriage is driven towards the first carriage, and the second elastic module between the second carriage and the first carriage and the first elastic module between the first carriage and the base are both compressed. At this time, the first carriage drives the two clamping mechanisms to clamp the handheld electronic device so that the handheld electronic device is reliably fixed onto the second carriage.

16 Claims, 21 Drawing Sheets

HOLDER

CROSS-REFERENCE TO RELATED APPLICATION

This application claims the priority benefit of Taiwan application serial No. 98102037, filed on Jan. 20, 2009. The entirety of the above-mentioned patent application is hereby incorporated by reference herein and made a part of this specification.

BACKGROUND OF THE INVENTION

1. Field of the Invention

The present application relates to a holder. More particularly, the present application relates to a holder capable of reliably holding a handheld electronic apparatus.

2. Description of Related Art

In modern society, vehicles serve as transportation and occupational means. Based on drivers' demands, various devices have been installed in the vehicles, especially non-standard equipment that is not originally built in the vehicles, e.g., handheld electronic apparatuses. Common handheld electronic apparatuses for supplementing track information and communication functions during driving include satellite navigators, personal digital assistants (PDAs), mobile phones, and so on.

To meet the above trend and allow the drivers to assemble the handheld electronic apparatuses into the vehicles and disassemble the same for use after driving, car holders capable of reliably holding the handheld electronic apparatuses into the vehicles have been developed. A conventional holder for holding an automotive handheld electronic device in the market is mostly compatible with a single-model handheld electronic device in one dimension only. If a driver intends to use another handheld electronic device with a different size, another holder having a corresponding dimension must be installed instead. By contrast, more time must be spent on assembling and disassembling the handheld electronic apparatus when a universal automotive holder in a large dimension and with a complicated use is utilized, thereby reducing facilitation of carrying the handheld electronic apparatus.

SUMMARY OF THE INVENTION

The present application is directed to a holder compatible with handheld electronic apparatuses with different dimensions.

In the present application, a holder for reliably holding a handheld electronic apparatus includes a base, a first carriage, a first elastic module, a second carriage, a second elastic module, and two clamping mechanisms. The first carriage is disposed on the base and has an accommodation space for placing the handheld electronic apparatus. The first elastic module is disposed between the first carriage and the base, such that the first carriage moves back and forth with respect to the base along a disposition direction. The second carriage is disposed in the accommodation space. The second elastic module is disposed between the second carriage and the first carriage, such that the second carriage moves back and forth with respect to the first carriage along the disposition direction. The two clamping mechanisms are disposed on the base and located at two respective sides of the accommodation space. Each of the two clamping mechanisms respectively interferes with the first carriage, and a portion of each of the two clamping mechanisms moves toward the accommodation space when the first carriage moves toward the base, so as to hold the handheld electronic apparatus.

In light of the foregoing, a difference between the conventional holder and the holder of the present application lies in that the subject holder can reliably hold the handheld electronic apparatuses with different widths, thicknesses, and dimensions. Additionally, the holder of the present invention can be operated in a simple and fast manner, thereby giving rise to an increase in the convenience of use.

In order to make the aforementioned and other features and advantages of the present invention more comprehensible, several embodiments accompanied with figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
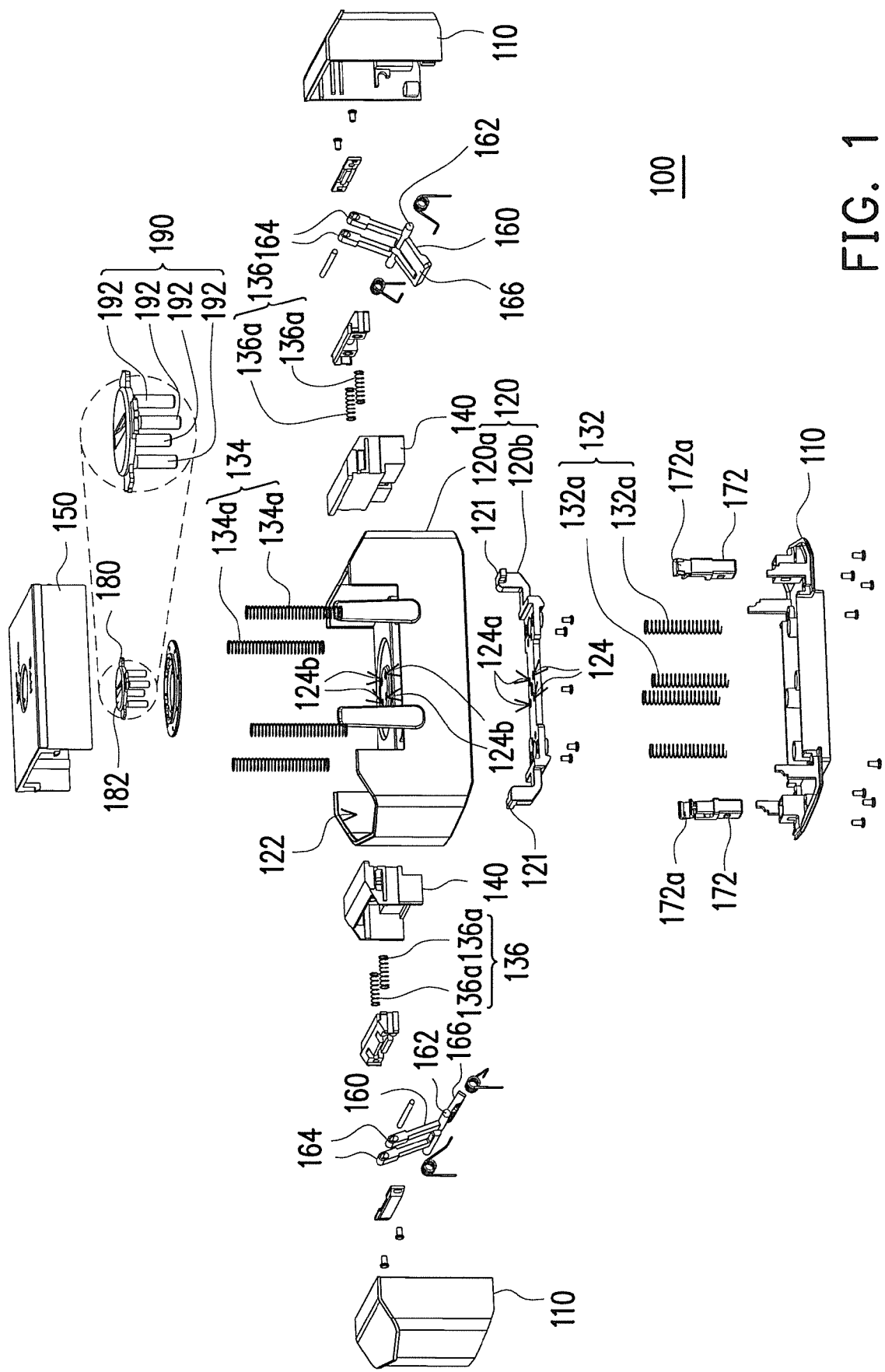
FIG. 1 is an exploded view of a holder according to an embodiment of the present invention.
Figure 2A:
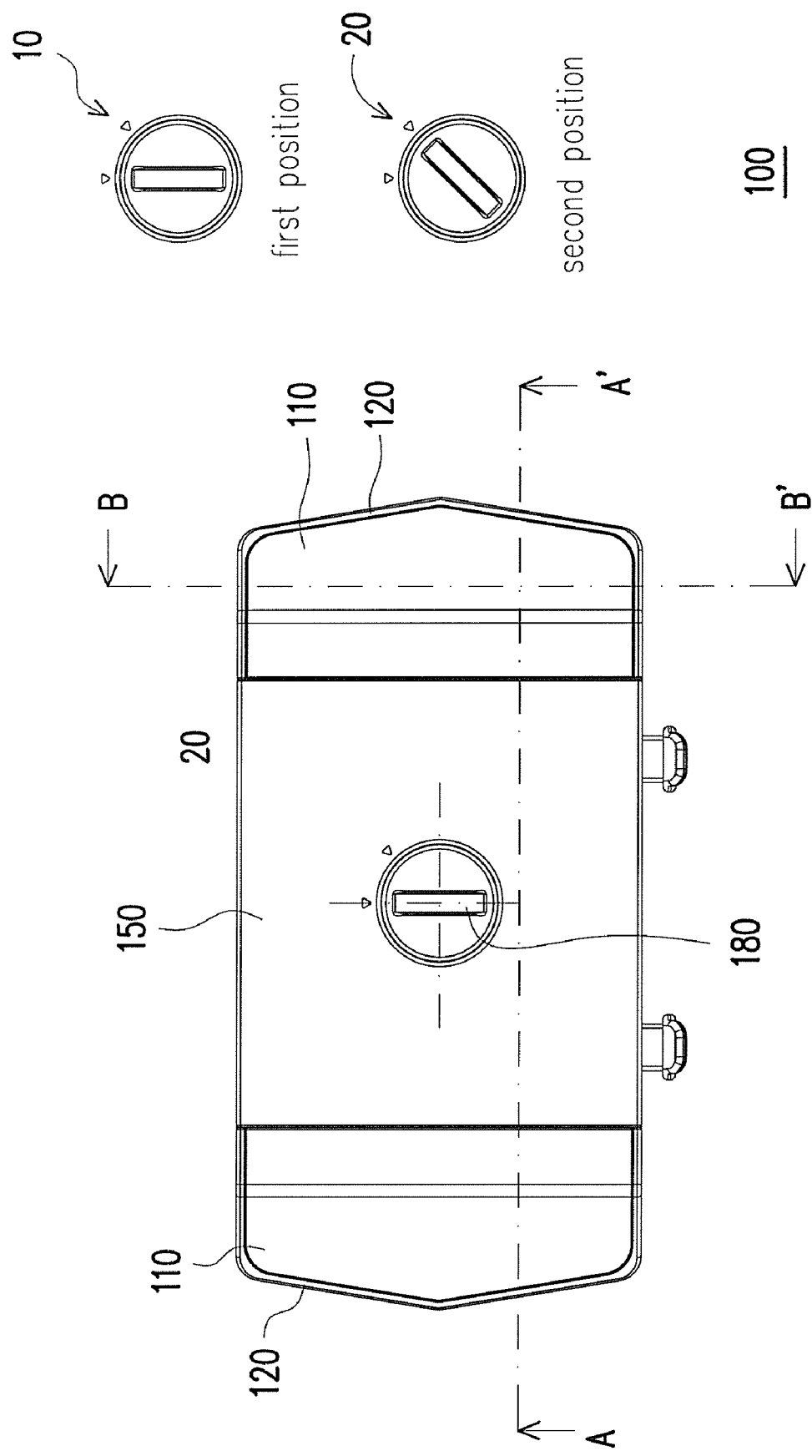
FIG. 2A is a front view of the holder according to the embodiment of the present invention.
Figure 2B:
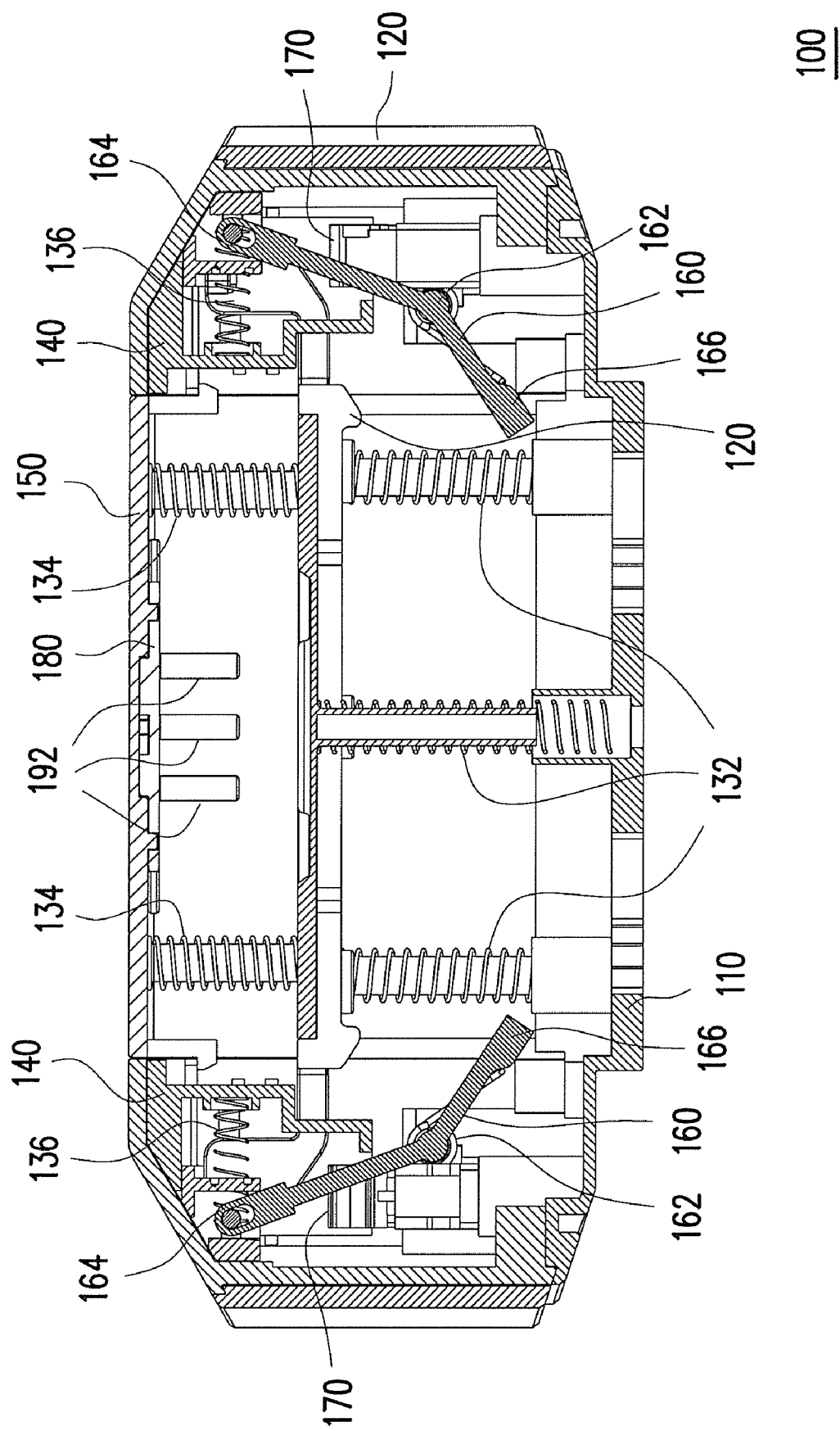
FIG. 2B is a cross-sectional view of the holder depicted in FIG. 2A along a sectional line A-A'.
Figure 2C:
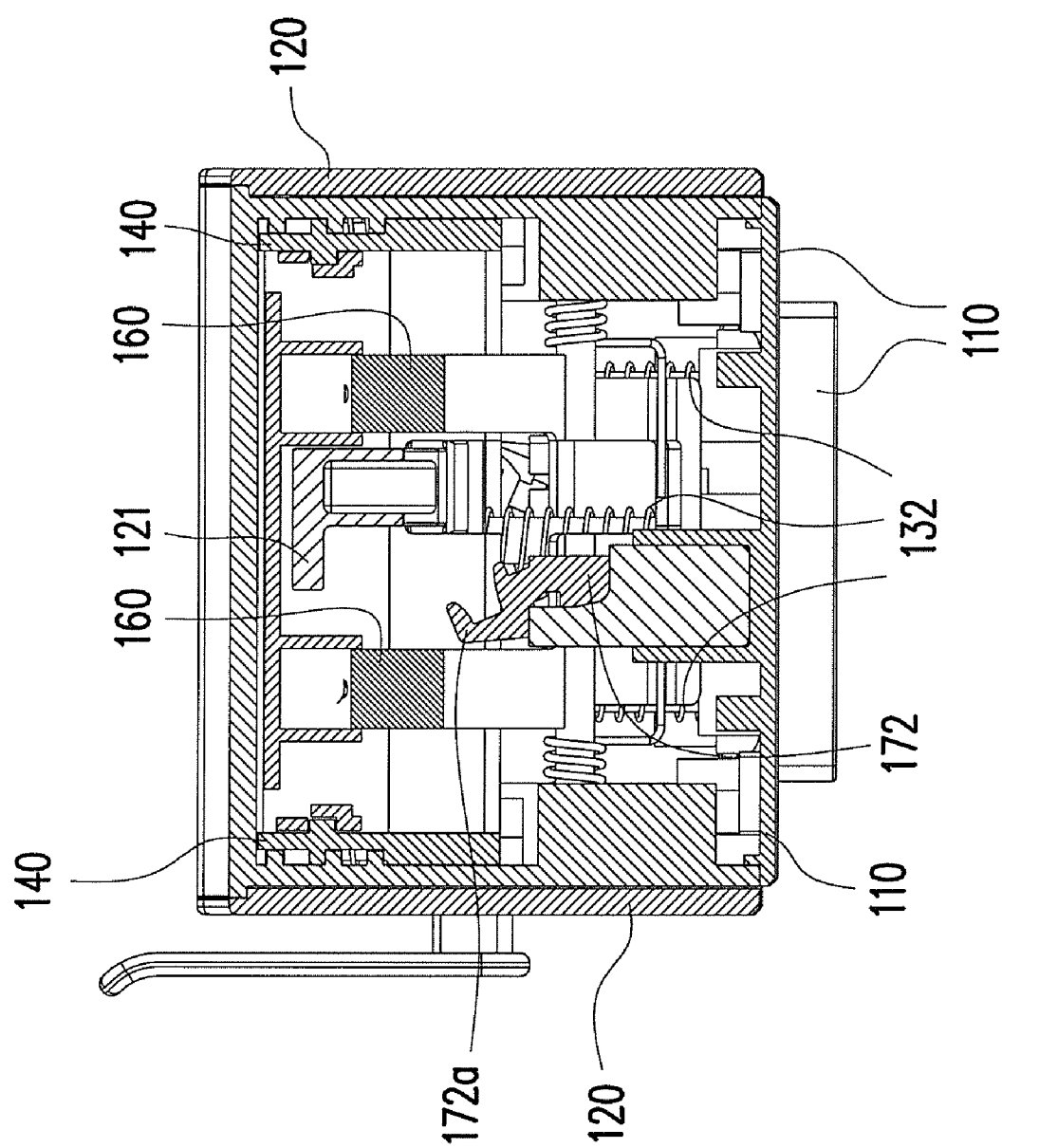
FIG. 2C is a cross-sectional view of the holder depicted in FIG. 2A along a sectional line B-B'.

FIG. 1 is an exploded view of a holder according to an embodiment of the present invention. FIG. 2A is a front view of the holder according to the same embodiment of the present invention. FIGS. 2B and 2C are cross-sectional views of the holder depicted in FIG. 2A along sectional lines A-A' and B-B', respectively. Referring to FIGS. 1 and 2A-2C, the holder 100 includes a base 110, a first carriage 120, a first elastic module 132, two blocks 140, a second carriage 150, a second elastic module 134, and two connecting rods 160. The first carriage 120 has a body 120a and a plate 120b. Besides, the first carriage 120 is disposed on the base 110. The first elastic module 132 is located between the base 110 and the first carriage 120. The second carriage 150 is disposed within an accommodation space 122, and the second elastic module 134 is located between the second carriage 150 and the first carriage 120. Additionally, one of the two blocks 140 and one of the two connecting rods 160 together serve as a clamping mechanism, and the clamping mechanisms are disposed at two respective sides of the accommodation space 122 according to the present embodiment. The clamping mechanisms constituted by the blocks 140 and the connecting rods 160 interfere with the first carriage 120. Thereby, a portion of each of the clamping mechanisms moves toward the accommodation space 122 when the first carriage 120 moves toward the base 110, so as to hold the handheld electronic apparatus.

To be more specific, the two connecting rods 160 are located between the two blocks 140 and the base 110. Besides, the two connecting rods 160 are respectively connected to the base 110 at a pivot 162. Each of the two connecting rods 160 respectively has a first end 164 and a second end 166 at two respective sides of the pivot 162. The first end 164 of each of the two connecting rods 160 leans against one of the two blocks 140, and the second ends 166 of the two connecting rods 160 are located at a movement path of the first carriage 120. When the first carriage 120 is moved, the two connecting rods 160 are driven and rotated, and the two blocks 140 are respectively pushed by the first ends 164 of the two connecting rods 160, such that the two blocks 140 are protruded into the accommodation space 122 for holding the handheld electronic apparatus 200 placed in the accommodation space 122. In addition, a third elastic module 136 can be disposed between the blocks 140 and the first ends 162 of the connecting rods 160, so as to provide an elastic-restoring force during the movement of the blocks 140.

A push-push type mechanism 170 can be disposed on the base 110 and can interfere with the first carriage 120. Besides, the holder 100 can further include a rotating member 180 and a supporting member 190. The rotating member 180 is pivotably disposed on the second carriage 150. The supporting member 190 connects a rotary disc 182 of the rotating member 180. Hence, the supporting member 190 is selectively driven by the rotating member 180 and leans between the first carriage 120 and the second carriage 150, so as to adjust a stroke of the second carriage 150 with respect to the first carriage 120. As such, the holder 100 of the present embodiment can achieve a function of being compatible with handheld electronic apparatuses with various dimensions.

In detail, as shown in FIG. 2A, whether or not the supporting member 190 leans between the first carriage 120 and the second carriage 150 can be determined upon rotating the rotating member 180 according to the present embodiment. Particularly, the supporting member 190 is connected to the rotating member 180 and is comprised of a plurality of supporting pillars 192. When the handheld electronic apparatus 200 with a relative small thickness is placed in the holder 100, the rotating member 180 is located at a first position 10 as indicated in FIG. 2A, and the supporting pillars 192 lean against the first carriage 120. Therefore, there exists a height difference between the first carriage 120 and the second carriage 150, and the stroke of the second carriage 150 with respect to the first carriage 120 is decreased.

By contrast, when a handheld electronic apparatus 200 with a relative large thickness is placed in the holder 100, the rotating member 180 is rotated and then located at a second position 20 as indicated in FIG. 2A. Here, the supporting pillars 192 are driven by the rotating member 180 and rotated at an angle, such that the supporting pillars 192 are simultaneously corresponding to a plurality of holes 124b of the body 120a and a plurality of holes 124a of the plate 120b in the first carriage 120. Thereby, when the handheld electronic apparatus 200 is placed in the holder 100, the supporting pillars 192 are inserted into the corresponding holes 124a and 124b on the first carriage 120, and the second carriage 150 directly leans against the first carriage 120, so as to reduce the height difference between the first carriage 120 and the second carriage 150 and to increase the accommodation space 122 where the handheld electronic apparatus 200 is placed.

The above design allows the holder 100 to accomplish significant compatibility. Users are able to adjust the positions of the rotating member 180 based on the size of the handheld electronic apparatus 200, so as to modify the dimension of the accommodation space 122 of the holder 100, thus diversifying usage of the holder 100 in a more convenient fashion. The operational manner of the holder 100 is further elaborated hereinafter together with the drawings.

Figure 3A:
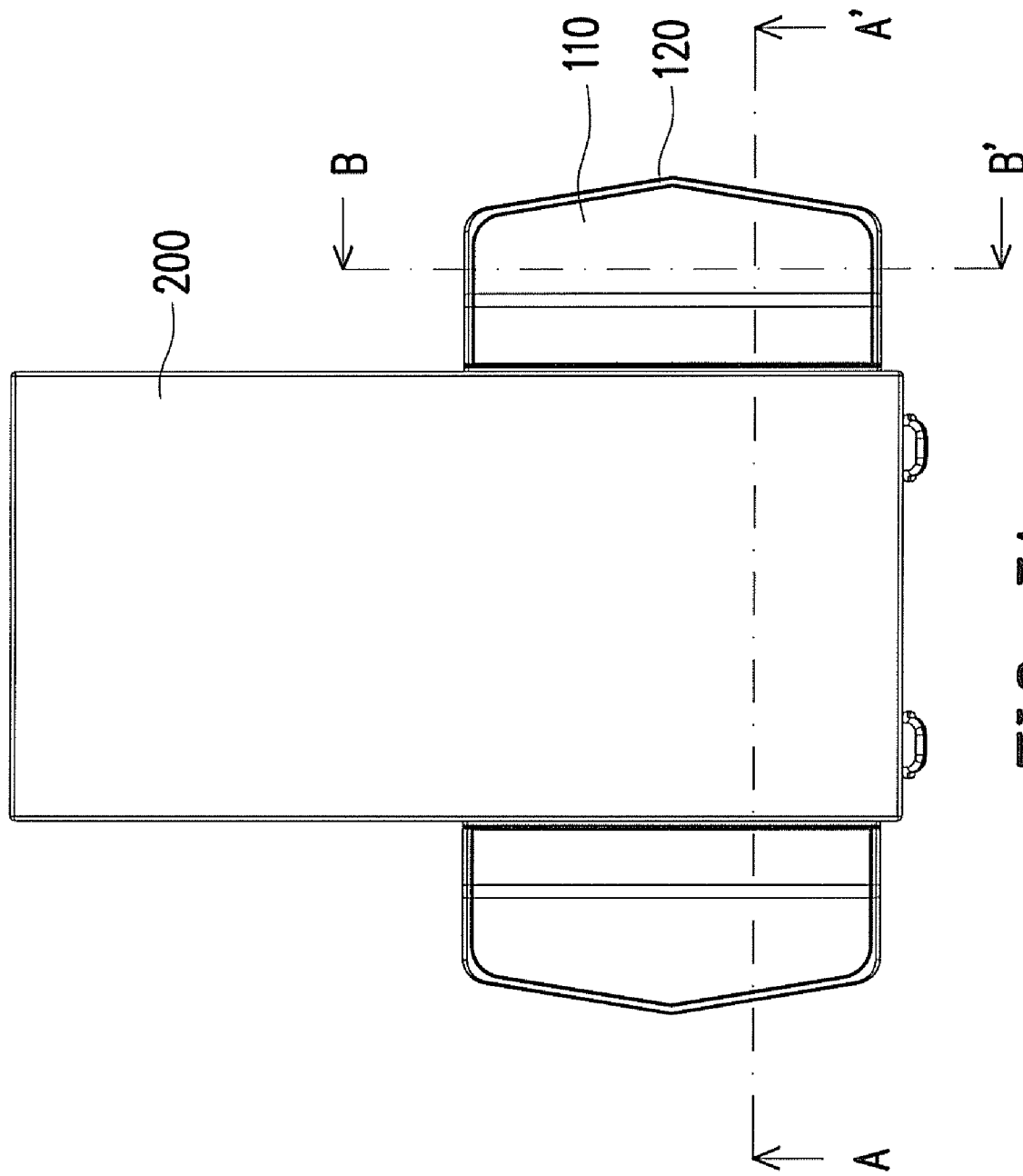
FIGS. 3 to 5 sequentially illustrate an operating process of reliably holding a handheld electronic apparatus by means of a holder according to an embodiment of the present invention.
Figure 3B:
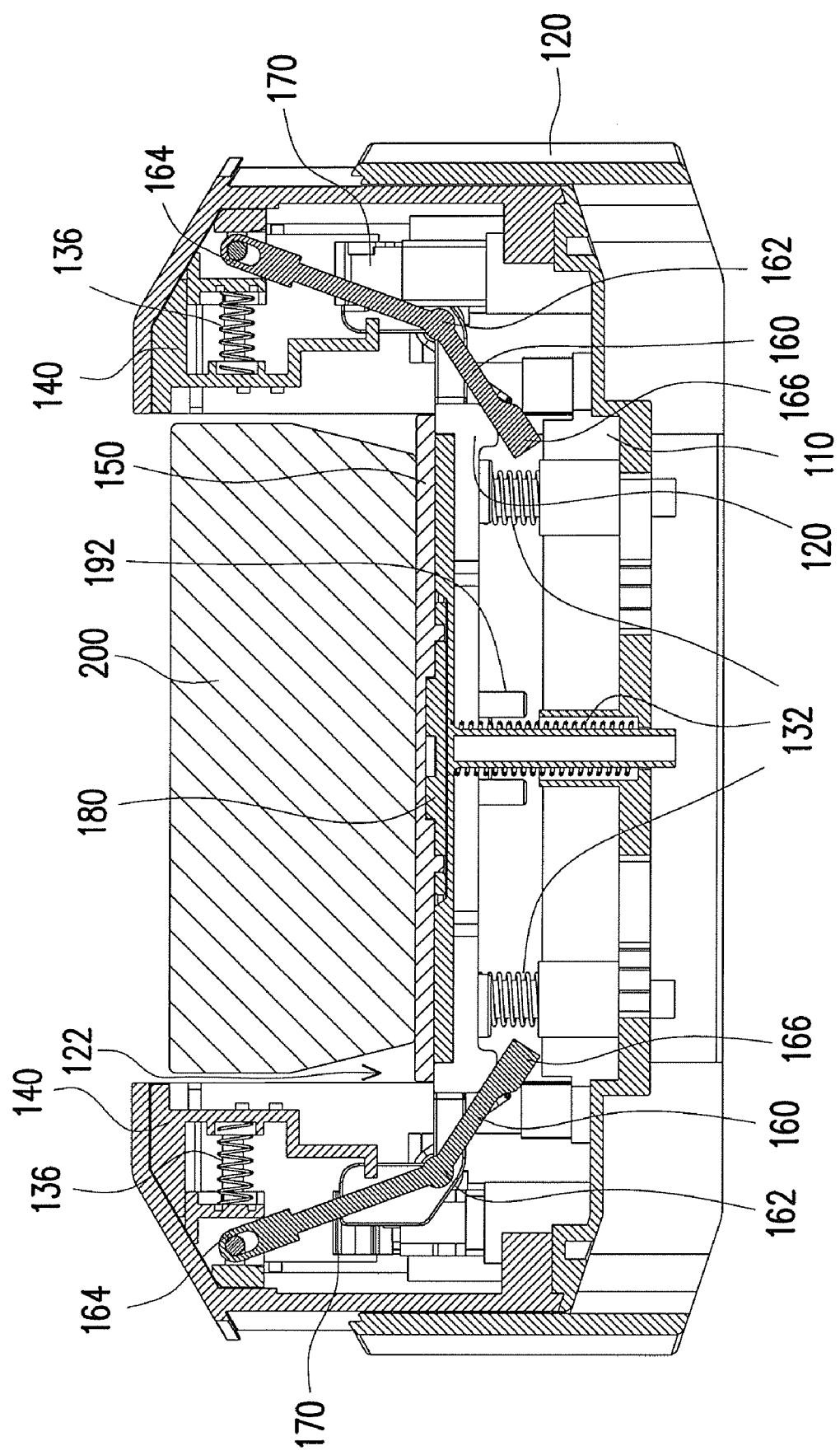
Figure 3C:
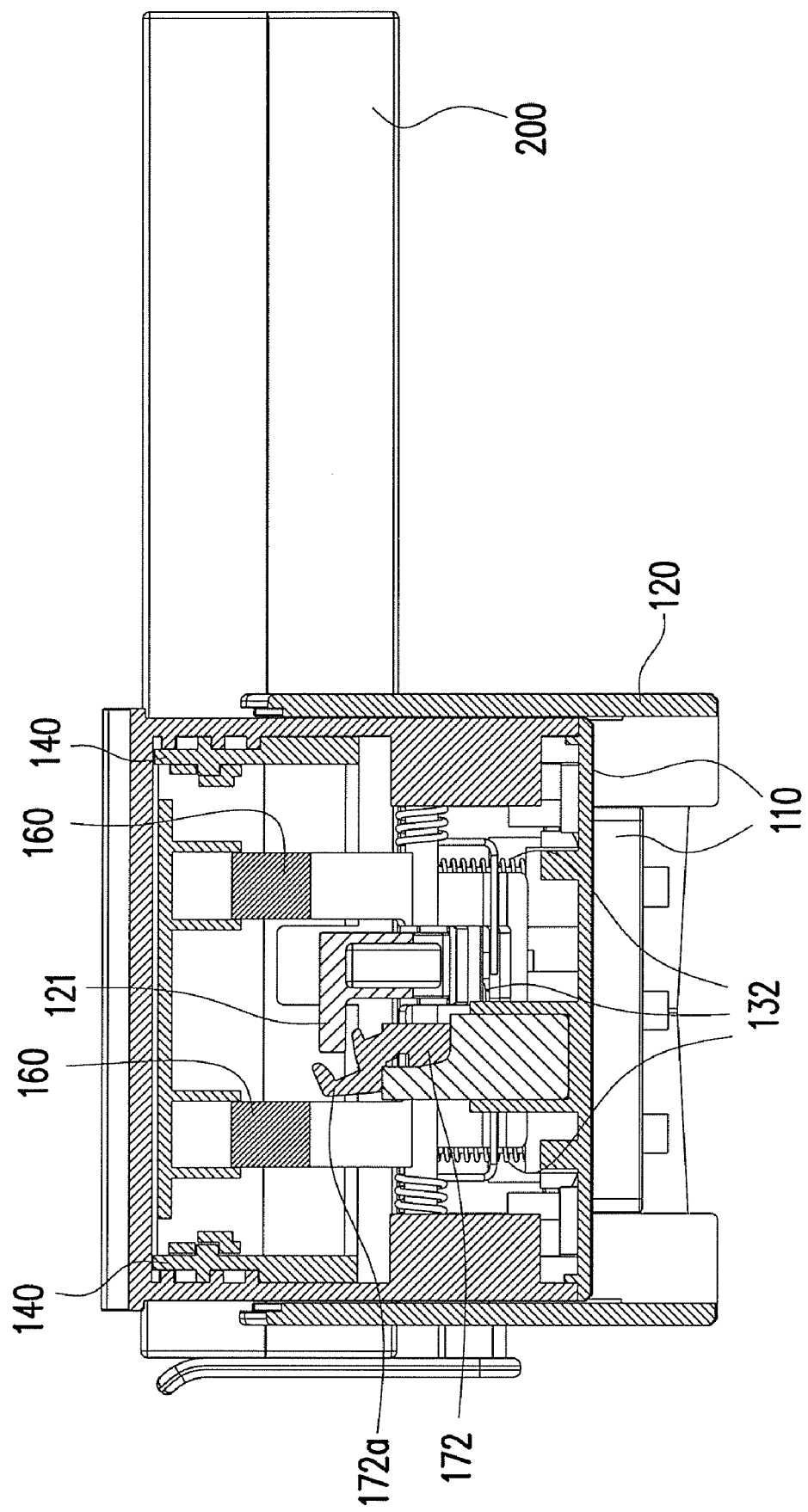
Figure 4A:
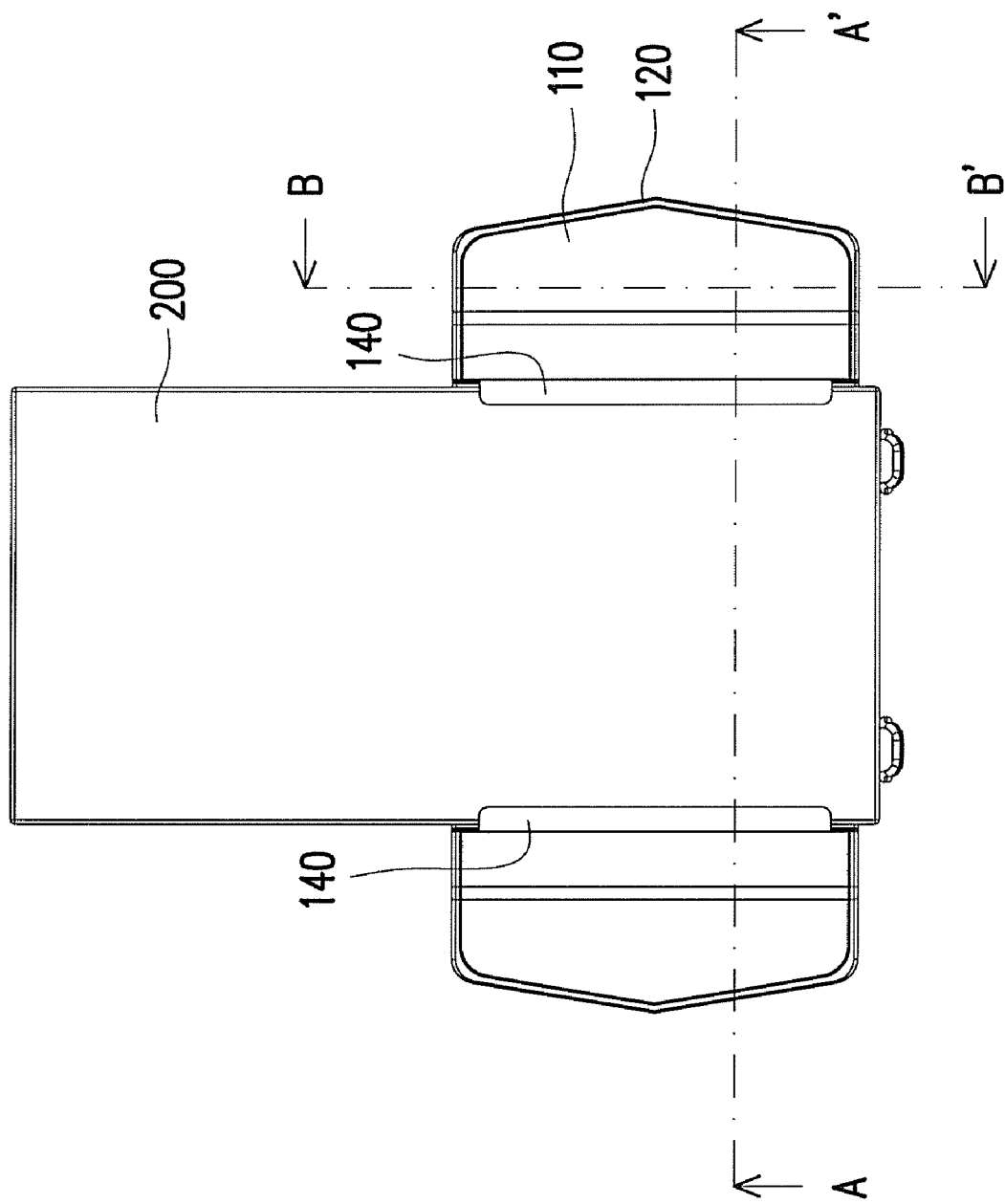
Figure 4B:
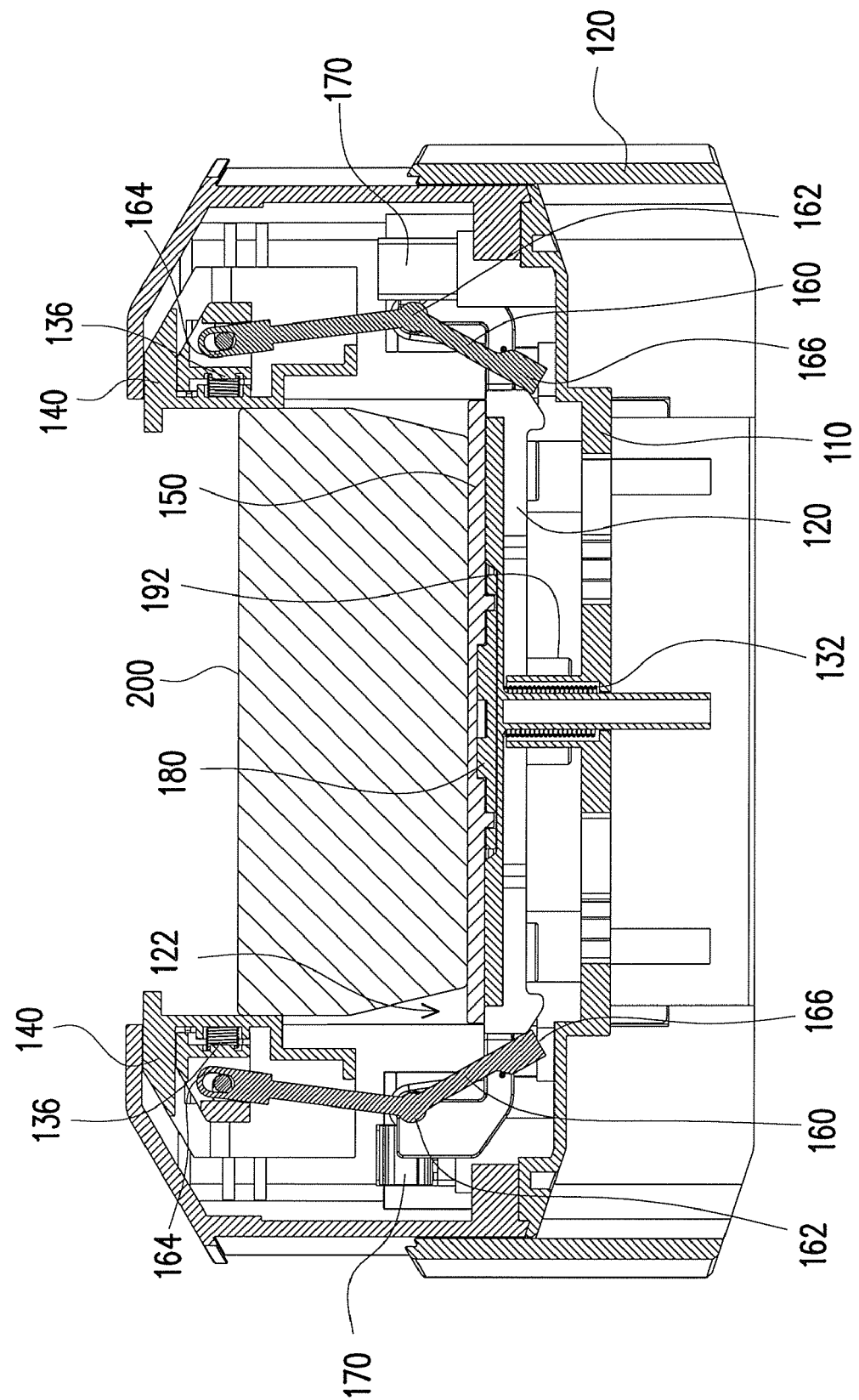
Figure 4C:
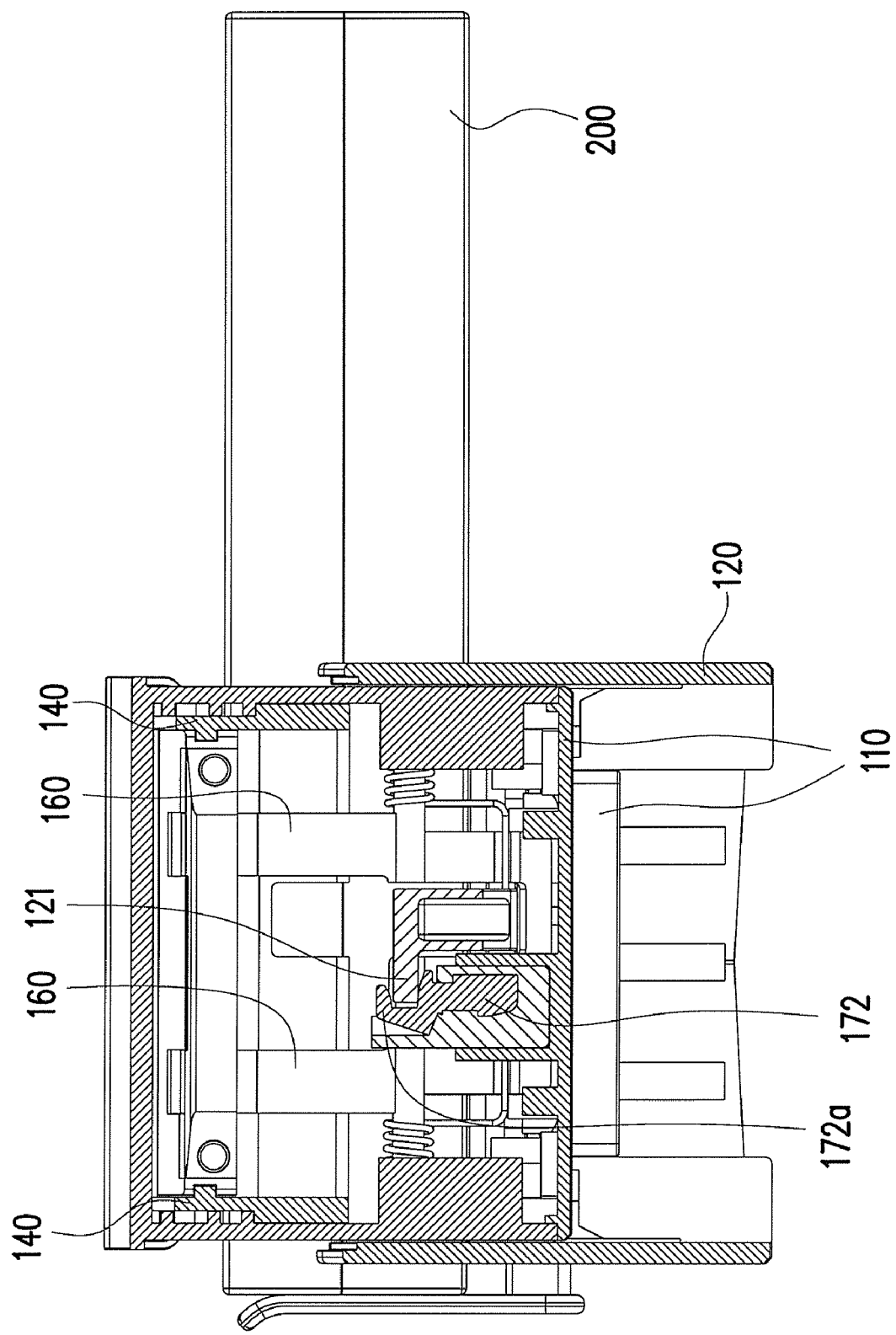
Figure 5A:
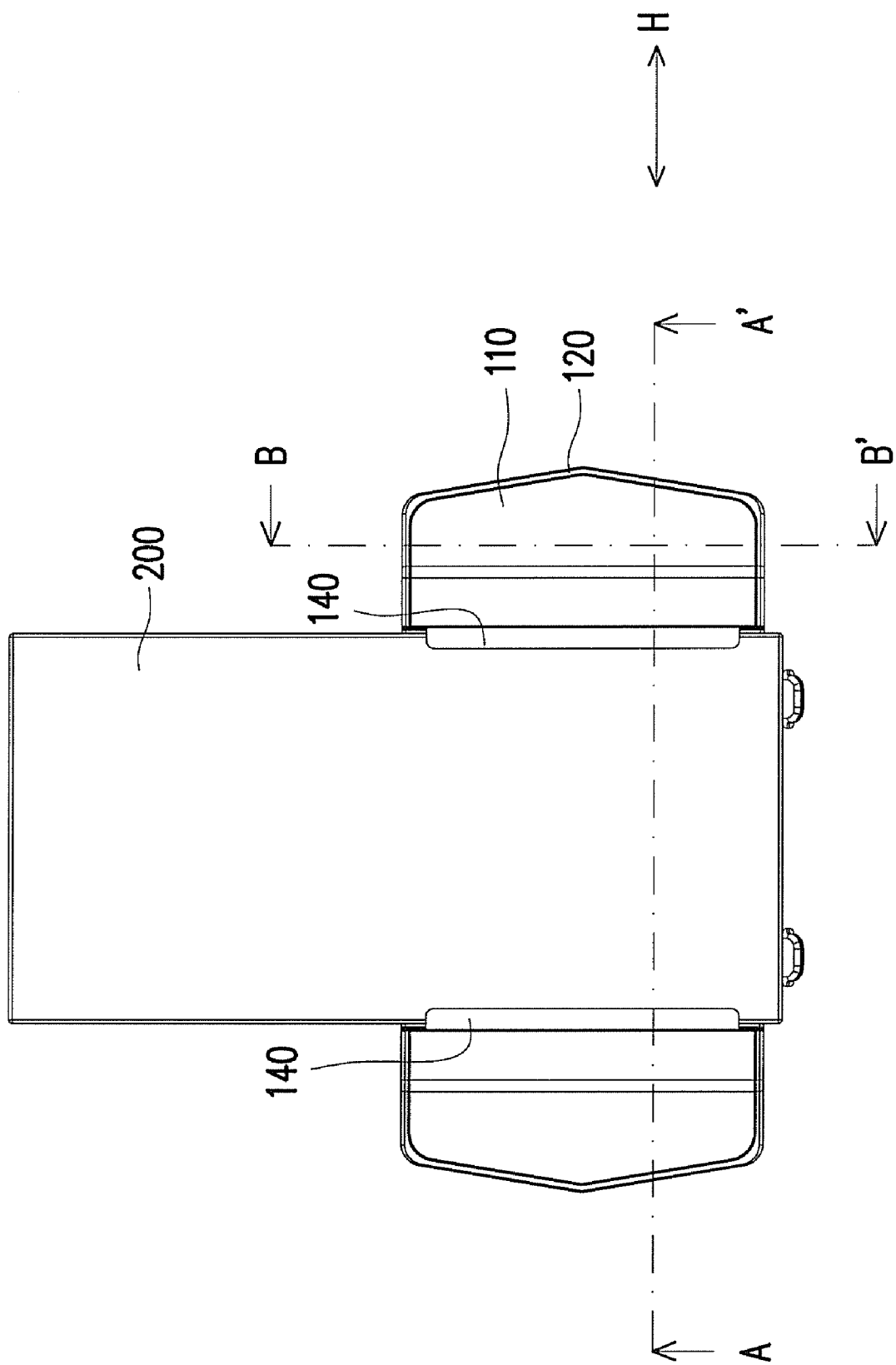
Figure 5B:
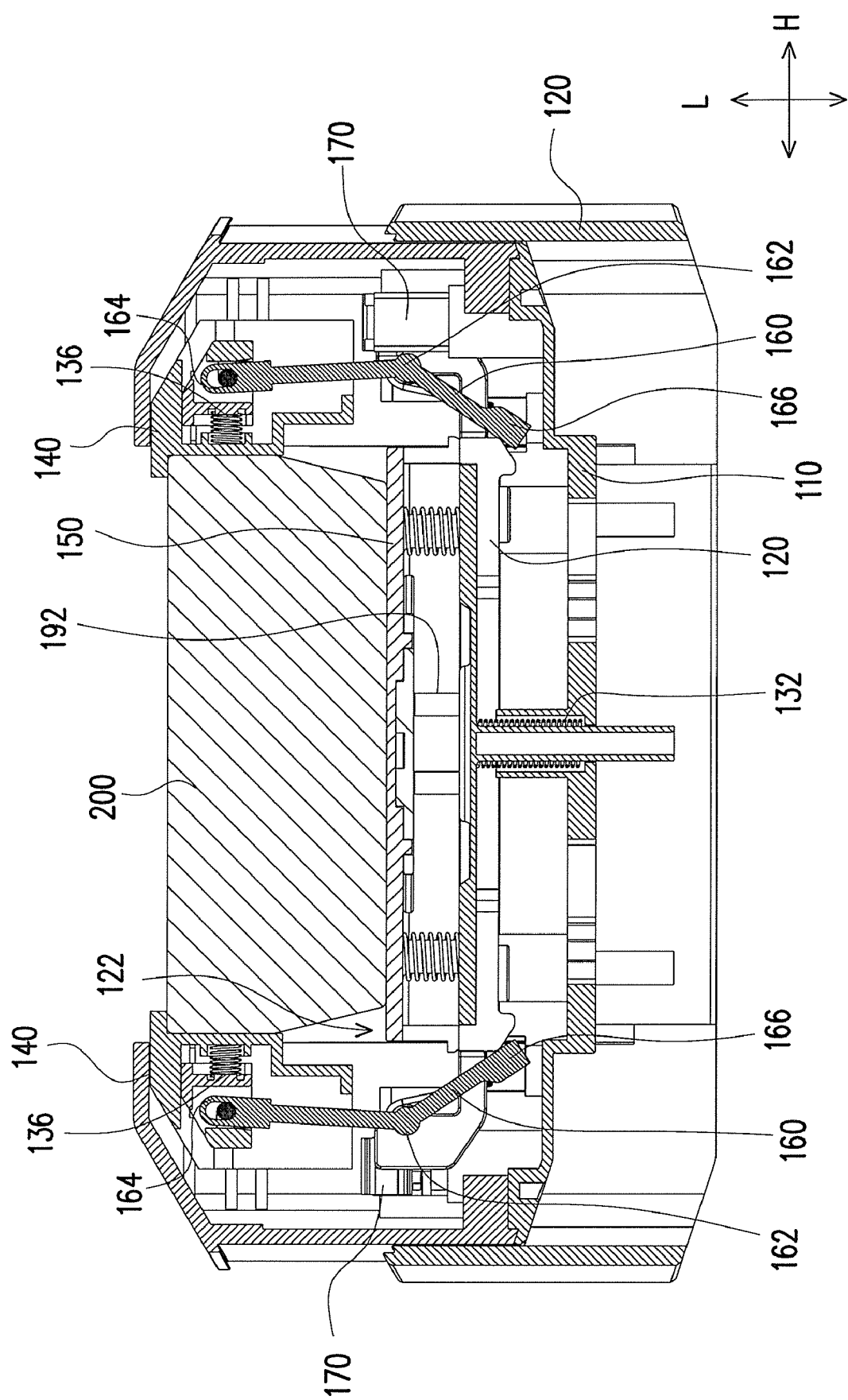
Figure 5C:
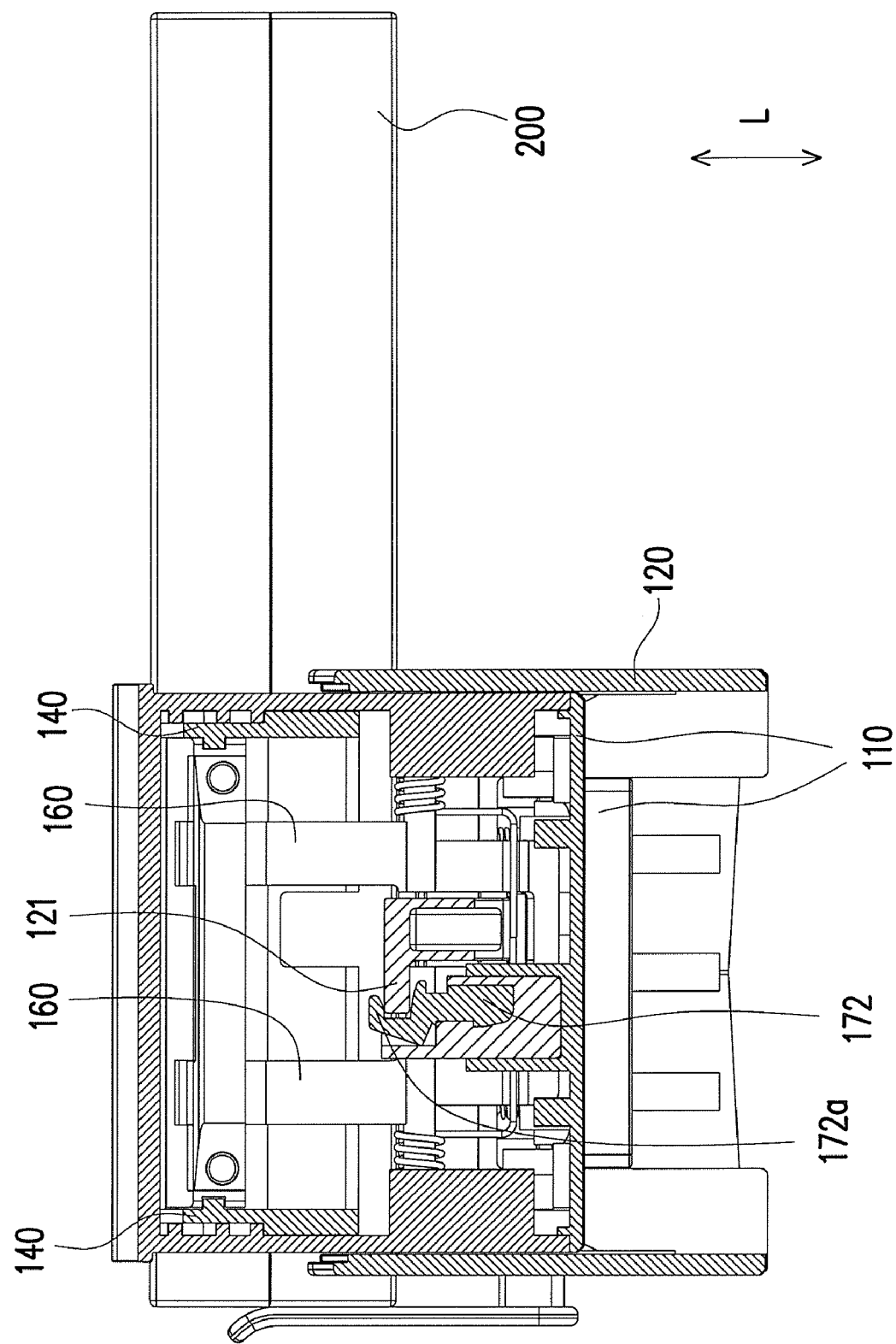

FIGS. 3 to 5 sequentially illustrate an operating process of reliably holding a handheld electronic apparatus by means of a holder according to an embodiment of the present invention. Here, FIGS. 3A-5A are front views illustrating the operating process, FIGS. 3B-5B are cross-sectional views illustrating the operating process along a sectional line A-A', and FIGS. 3C-5C are cross-sectional views illustrating the operating process along a sectional line B-B'.

First, referring to FIGS. 3A-3C, in the present embodiment, the rotating member 180 is rotated and then located at the second position 20 as shown in FIG. 2A, such that the rotating member 180 can be used together with the handheld electronic apparatus 200 with a relatively large thickness. A bottom surface of the handheld electronic apparatus 200 first contacts a top surface of the second carriage 150, and the second carriage 150 is driven and moved downward. Meanwhile, the supporting pillars 192 are correspondingly inserted into the holes 124a and 124b of the first carriage 120, and therefore the second carriage 150 can compress the second elastic module 134 and lean against the first carriage 120. Here, the first carriage 120 compresses the first elastic module 132 and contacts the second ends 166 of the two connecting rods 160. The first elastic module 132 at least includes a first spring 132a disposed between the first carriage 120 and the base 110. The second elastic module 134 at least includes a second spring 134a disposed between the second carriage 150 and the first carriage 120.

Next, referring to FIGS. 4A-4C, the handheld electronic apparatus 200 continues moving downward and pushing the second carriage 150. In the meantime, the first carriage 120 leans against the second ends 166 of the two connecting rods 160, so as to drive the first ends 164 of the connecting rods 160 for pushing the corresponding blocks 140. As such, the blocks 140 are protruded into the accommodation space 122. In addition, the push-push type mechanism 170 of the present embodiment is, for example, two push-push type switches 172 that are respectively corresponding to a protrusion 121 of the first carriage 120 and located at two respective sides of the accommodation space 122. Here, the first carriage 120 moving downward arrives at an ultimate position, and the protrusion 121 of the first carriage 120 is correspondingly lodged into a hook 172a of each of the push-push type switches 172, such that the push-push type switches 172 are operated.

Thereafter, as shown in FIGS. 5A-5C, after the push-push type switches 172 are operated, the protrusion 121 of the first carriage 120 is clamped by the hooks 172a, so as to reliably hold the position of the first carriage 120. Simultaneously, after the first elastic module 132 is released, a part of the handheld electronic apparatus 200 is reversely pushed by the second carriage 150. Said part of the handheld electronic apparatus 200 leans against a portion of the blocks 140 protruded into the accommodation space 122. Thereby, the handheld electronic apparatus 200 is reliability held at a position in a vertical direction L. The first ends 164 of the connecting rods 160 compress the third elastic module 136, so as to hold the handheld electronic apparatus 200 between the two blocks 140 and reliability fix the handheld electronic apparatus 200 at a position in a horizontal direction H. The third elastic module 136 is, for example, two third spring sets 136a respectively disposed between each of the two blocks 140 and one of the connecting rods 160 corresponding thereto. Here, the holder 100 is able to reliably hold the handheld electronic apparatus 200.

On the other hand, when a user intends to free the handheld electronic apparatus 200 from the holder 100, the user is merely required to push the handheld electronic apparatus 200 downward for releasing the first carriage 120 held by the push-push type switches 172, and the holder 100 in the state depicted in FIGS. 5A-5C inversely returns to be in the state depicted in FIGS. 3A-3C. Referring to FIGS. 3-5, in the present embodiment, when the handheld electronic apparatus 200 is moved toward the base 110, the first carriage 120 can be driven, and the interference between the first carriage 120 and the push-push type switches 172 can be removed. Therefore, the first carriage 120 and the second carriage 150 can be pushed back to the initial positions due to an elastic potential energy released by the first elastic module 132 and the second elastic module 134, respectively. At the same time, the blocks 140 are driven by the first ends 164 of the connecting rods 160 and moved back to the initial positions, and the handheld electronic apparatus 200 then stops being held.

The holder 100 held the handheld electronic apparatus 200 with a relatively large thickness is described in the above embodiment. The handheld electronic apparatus 200 with a relatively large thickness moves along a longer path before placed in the holder 100. Given that it is necessary to hold a handheld electronic apparatuses with different dimensions, the position of the rotating member 180 can be adjusted for modifying the dimension of the accommodation space 122. Thereby, the handheld electronic apparatuses with different dimensions can be accommodated.

Figure 6A:
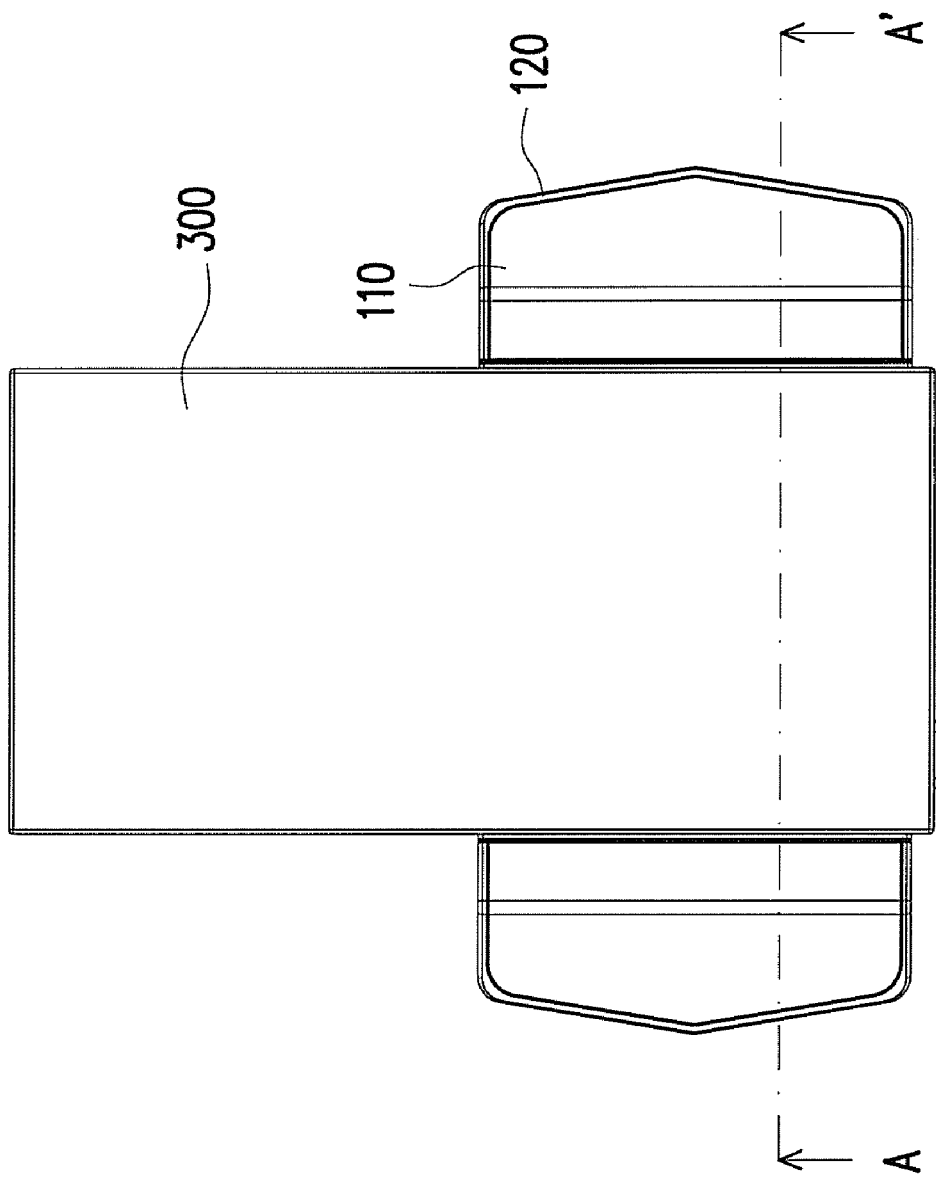
FIGS. 6 to 8 sequentially illustrate an operating process of reliably holding a handheld electronic apparatus in another dimension by means of a holder according to another embodiment of the present invention.
Figure 6B:
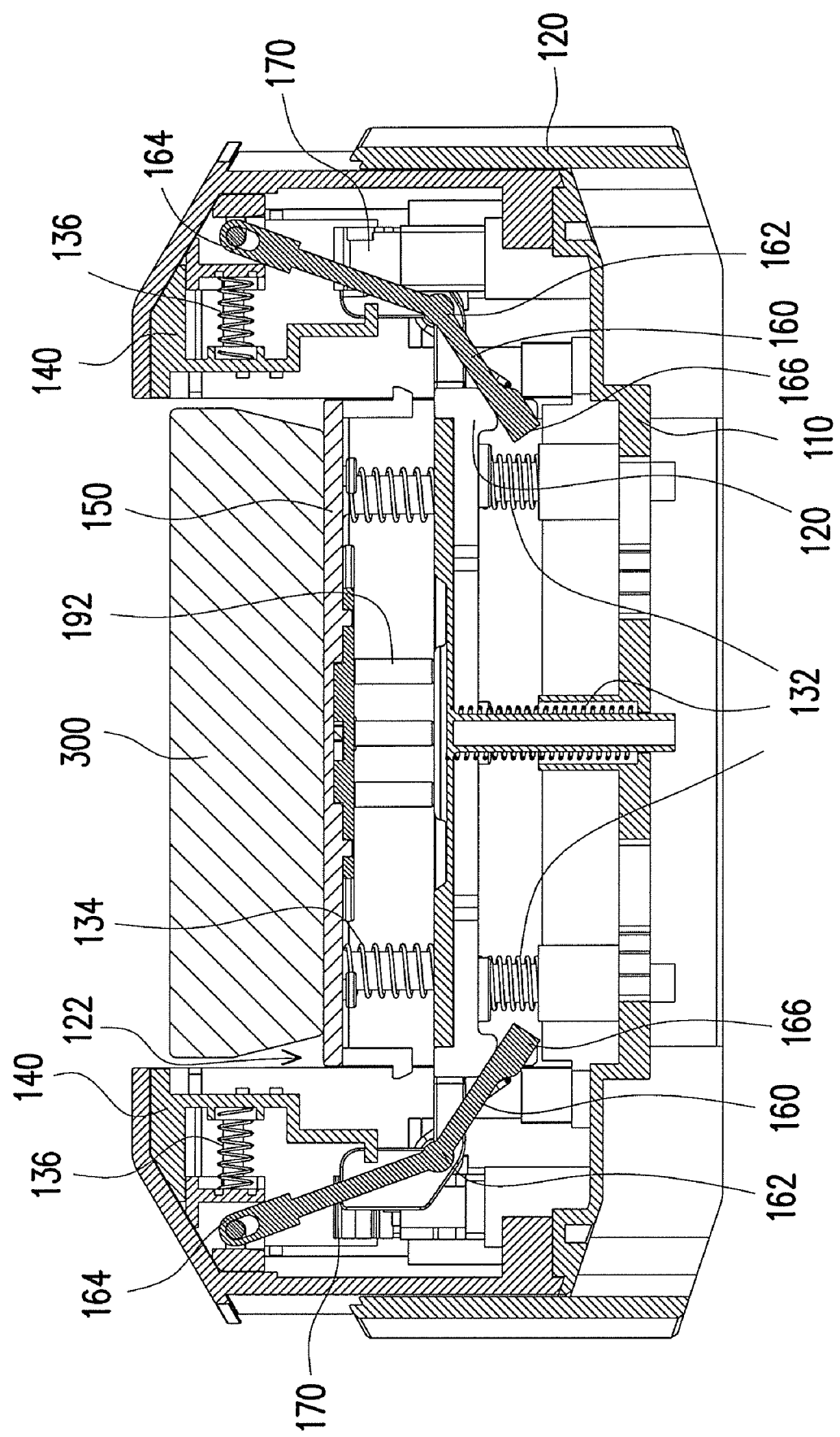
Figure 7A:
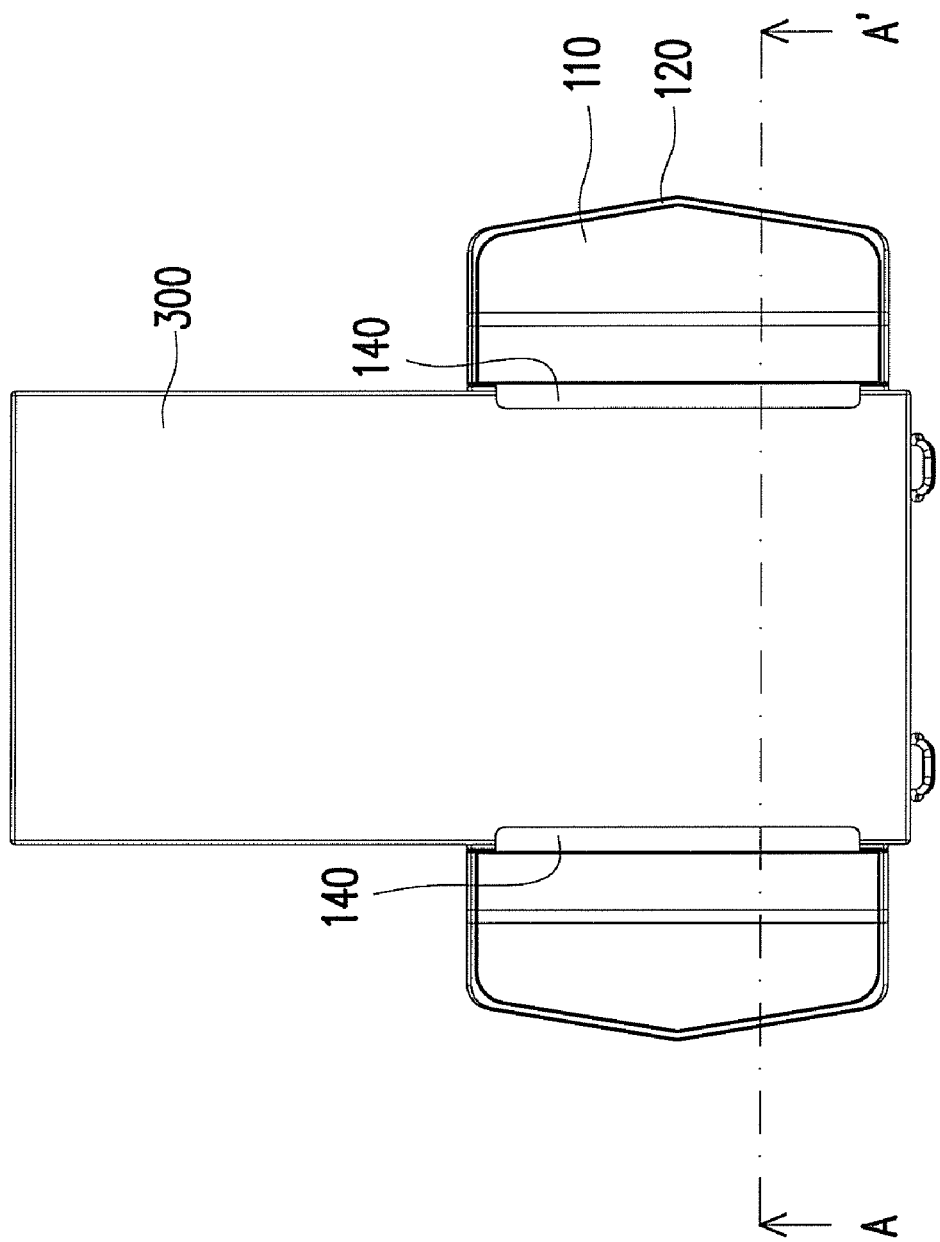
Figure 7B:
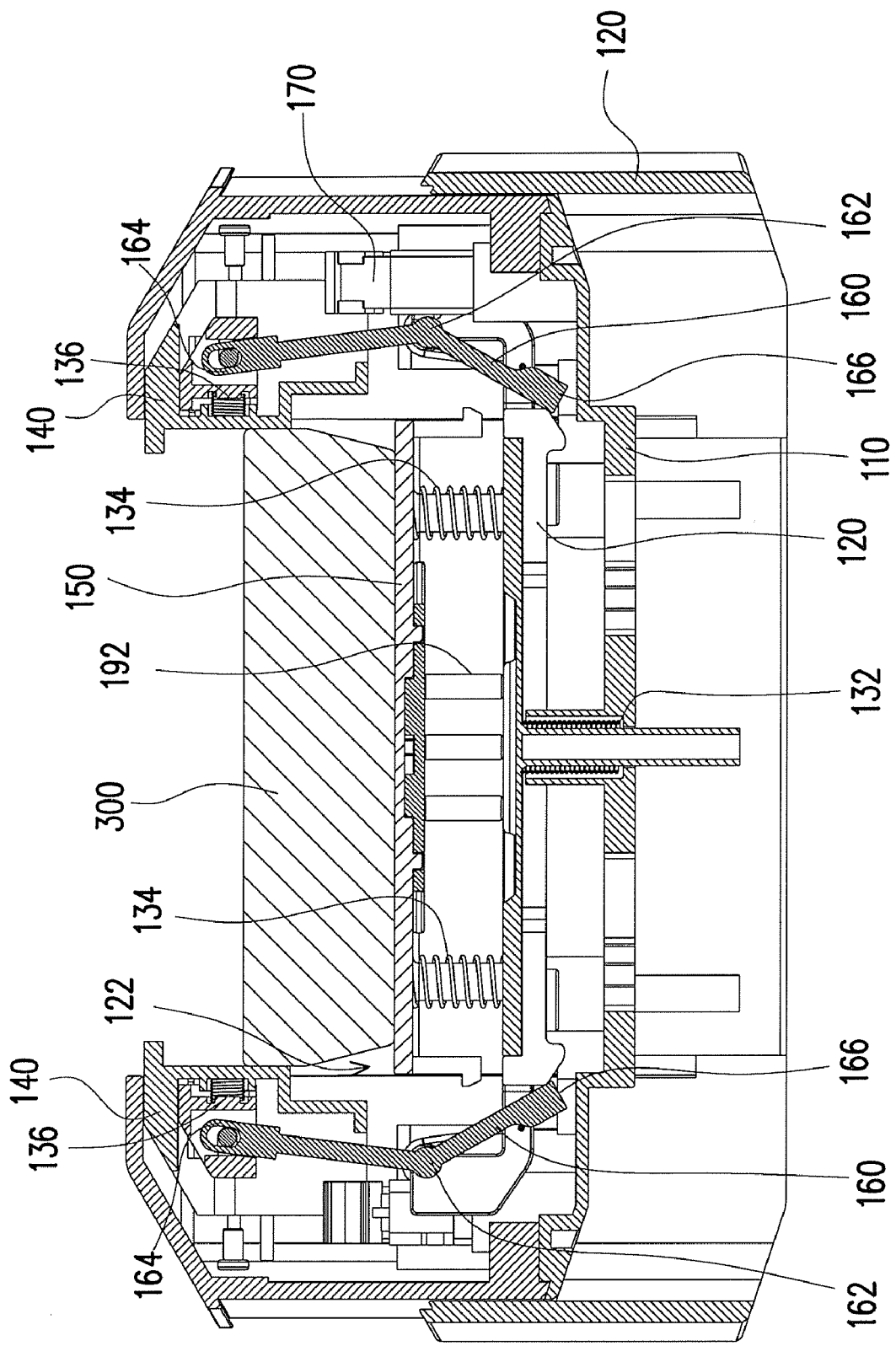
Figure 8A:
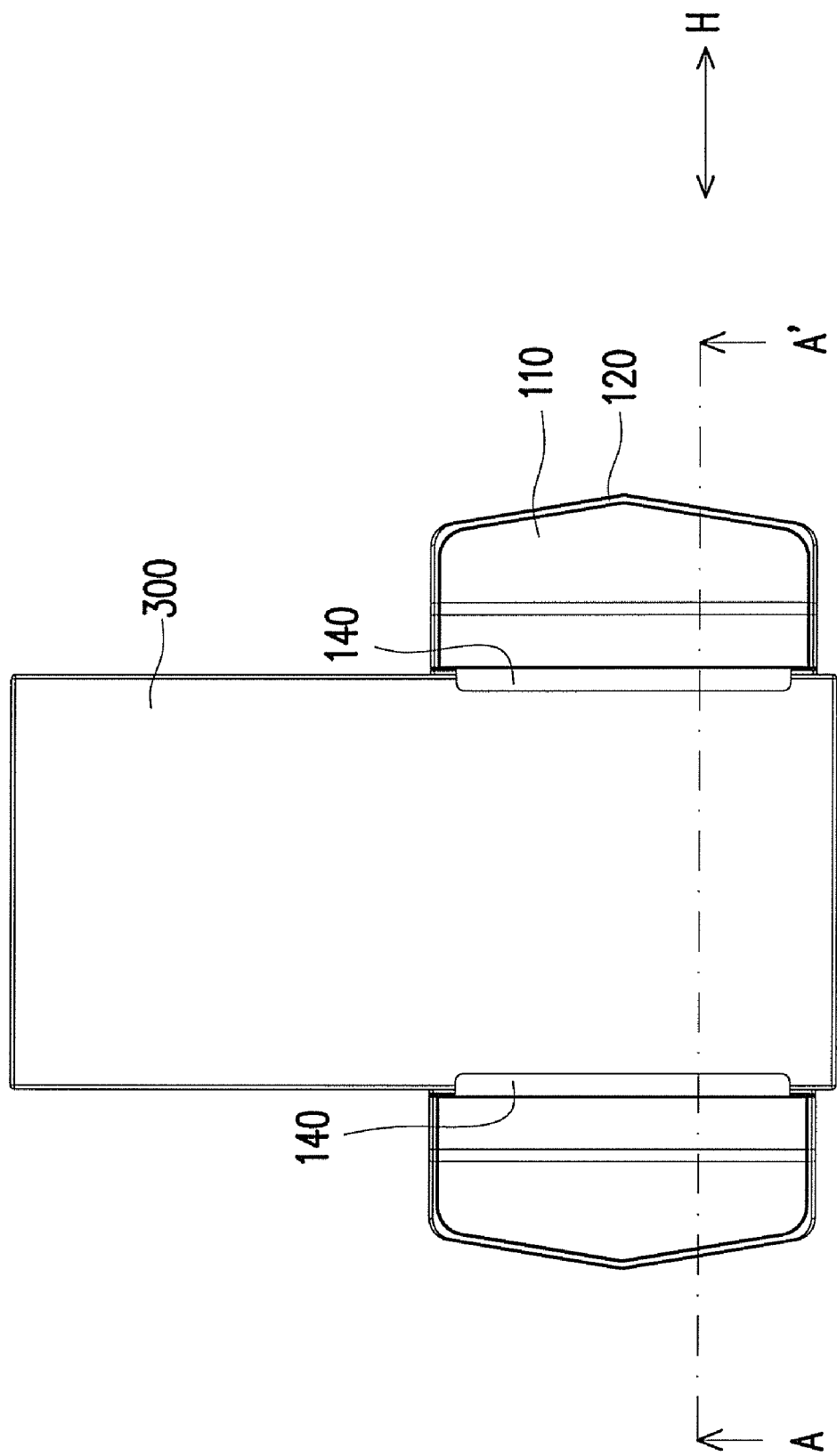
Figure 8B:
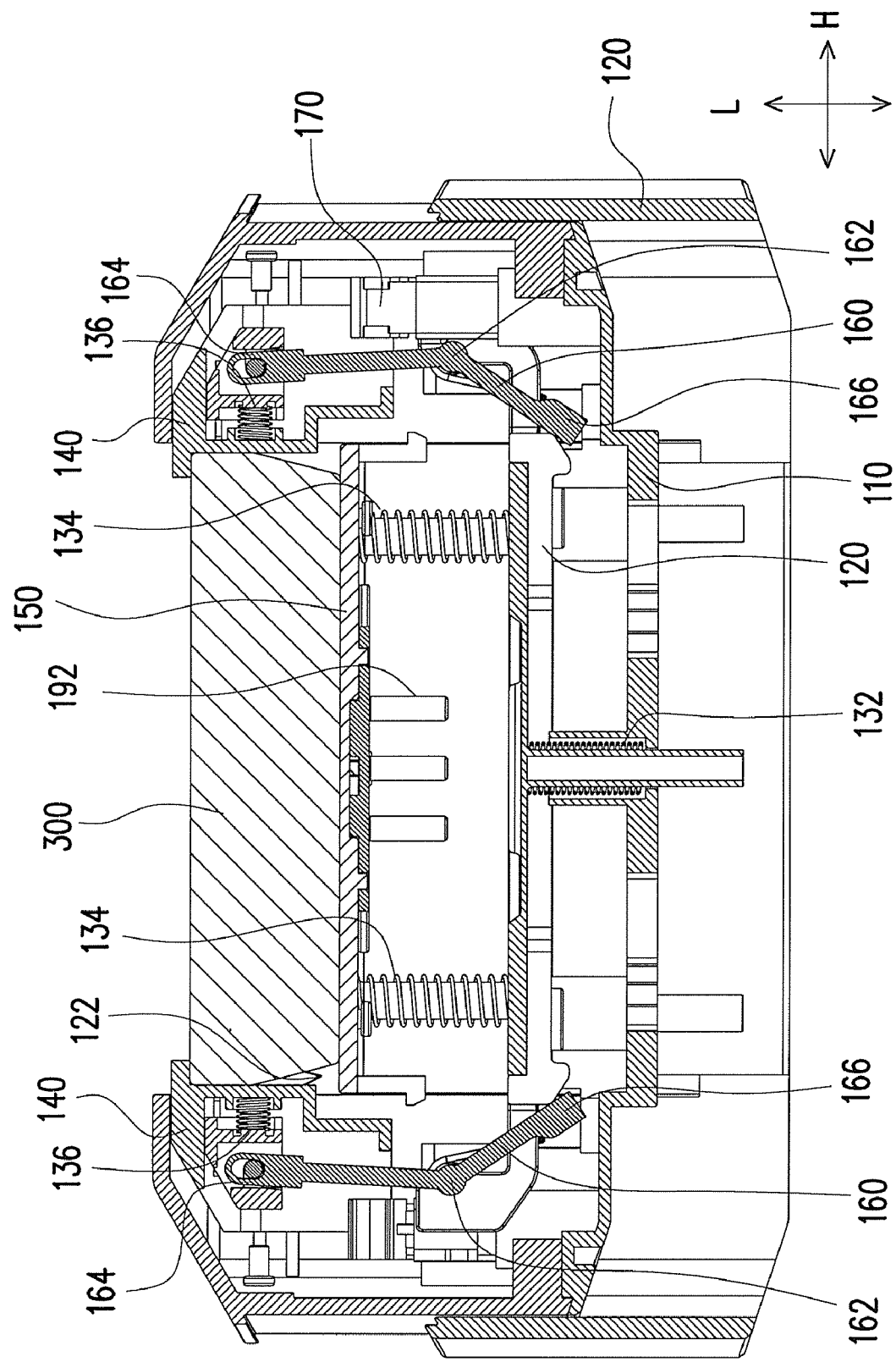

FIGS. 6 to 8 sequentially illustrate an operating process of reliably holding a handheld electronic apparatus in another dimension by means of a holder according to another embodiment of the present invention. Here, FIGS. 6A-8A are front views illustrating the operating process, and FIGS. 6B-8B are cross-sectional views illustrating the operating process along a sectional line A-A'.

First, referring to FIGS. 6A and 6B, in the present embodiment, the rotating member 180 is rotated and then located at the first position 10 as shown in FIG. 2A, such that the rotating member 180 can be used together with a handheld electronic apparatus 300 with a relatively small thickness. A bottom surface of the handheld electronic apparatus 300 first contacts a top surface of the second carriage 150, and the second carriage 150 is driven and moved downward to compress the second elastic module 134. Meanwhile, the supporting pillars 192 lean against the first carriage 120 and, therefore, the first carriage 120 and the second carriage 150 are continuously located in a distance. The first carriage 120 then starts compressing the first elastic module 132 and leaning against the second ends 166 of the two connecting rods 160. The first elastic module 132 at least includes a first spring 132a disposed between the first carriage 120 and the base 110. The second elastic module 134 at least includes a second spring 134a disposed between the second carriage 150 and the first carriage 120.

Next, referring to FIGS. 7A and 7B, the handheld electronic apparatus 300 continues moving downward and pushing the second carriage 150. In the meantime, after the supporting pillars 192 lean against the first carriage 120 and move toward the base 110 to a specific position, the first carriage 120 leans against the second ends 166 of the two connecting rods 160, so as to drive the first ends 164 of the connecting rods 160 for pushing the corresponding blocks 140. As such, the blocks 140 are protruded into the accommodation space 122. In addition, the two push-push type switches 172 of the present embodiment are respectively corresponding to a protrusion 121 of the first carriage 120 and located at two respective sides of the accommodation space 122. Here, the first carriage 120 moving downward arrives at an ultimate position, and the protrusion 121 of the first carriage 120 is correspondingly lodged into a hook 172a of each of the push-push type switches 172, such that the push-push type switches 172 are operated.

Thereafter, as shown in FIGS. 8A and 8B, after the push-push type switches 172 are operated, the protrusion 121 of the first carriage 120 is clamped by the hooks 172a, so as to reliably fix the position of the first carriage 120. Simultaneously, after the first elastic module 132 is released, a part of the handheld electronic apparatus 300 is pushed back by the second carriage 150. Said part of the handheld electronic apparatus 300 leans against a portion of the blocks 140 protruded into the accommodation space 122. Thereby, the handheld electronic apparatus 300 is reliability held at a position in a vertical direction L. The first ends 164 of the connecting rods 160 compress the third elastic module 136, such that the handheld electronic apparatus 300 is held between the two blocks 140, and that the handheld electronic apparatus 300 is reliability held at a position in a horizontal direction H. The third elastic module 136 is, for example, two third spring sets 136a respectively disposed between each of the two blocks 140 and one of the connecting rods 160 corresponding thereto. Here, the holder 100 is able to reliably hold the position of the handheld electronic apparatus 300.

On the other hand, when a user intends to free the handheld electronic apparatus 300 from the holder 100, the user is merely required to push the handheld electronic apparatus 300 downward for releasing the first carriage 120 clamped by the push-push type switches 172, and the holder 100 in the state depicted in FIGS. 8A-8B inversely returns to be in the state depicted in FIGS. 6A-6B. Referring to FIGS. 6-8, in the present embodiment, when the handheld electronic apparatus 300 is moved toward the base 110, the first carriage 120 can be driven, and the interference between the first carriage 120 and the push-push type switches 172 can be removed. Therefore, the first carriage 120 and the second carriage 150 can be pushed back to the initial positions due to an elastic potential energy released by the first elastic module 132 and the second elastic module 134, respectively. At the same time, the blocks 140 are driven by the first ends 164 of the connecting rods 160 and moved back to the initial positions, and the handheld electronic apparatus 300 then stops being held.

Note that the push-push type mechanism 170 is not limited to the two push-push type switches 172. Within a reasonable range, other mechanisms operated in a similar manner to that of the push-push type switches 172 can also be utilized for completing operation of the push-push type mechanism 170. Besides, the supporting member 190 is not limited to the supporting pillars 192, and other combination and modification within a reasonable range can be made for meeting actual demands.

Figure 9A:
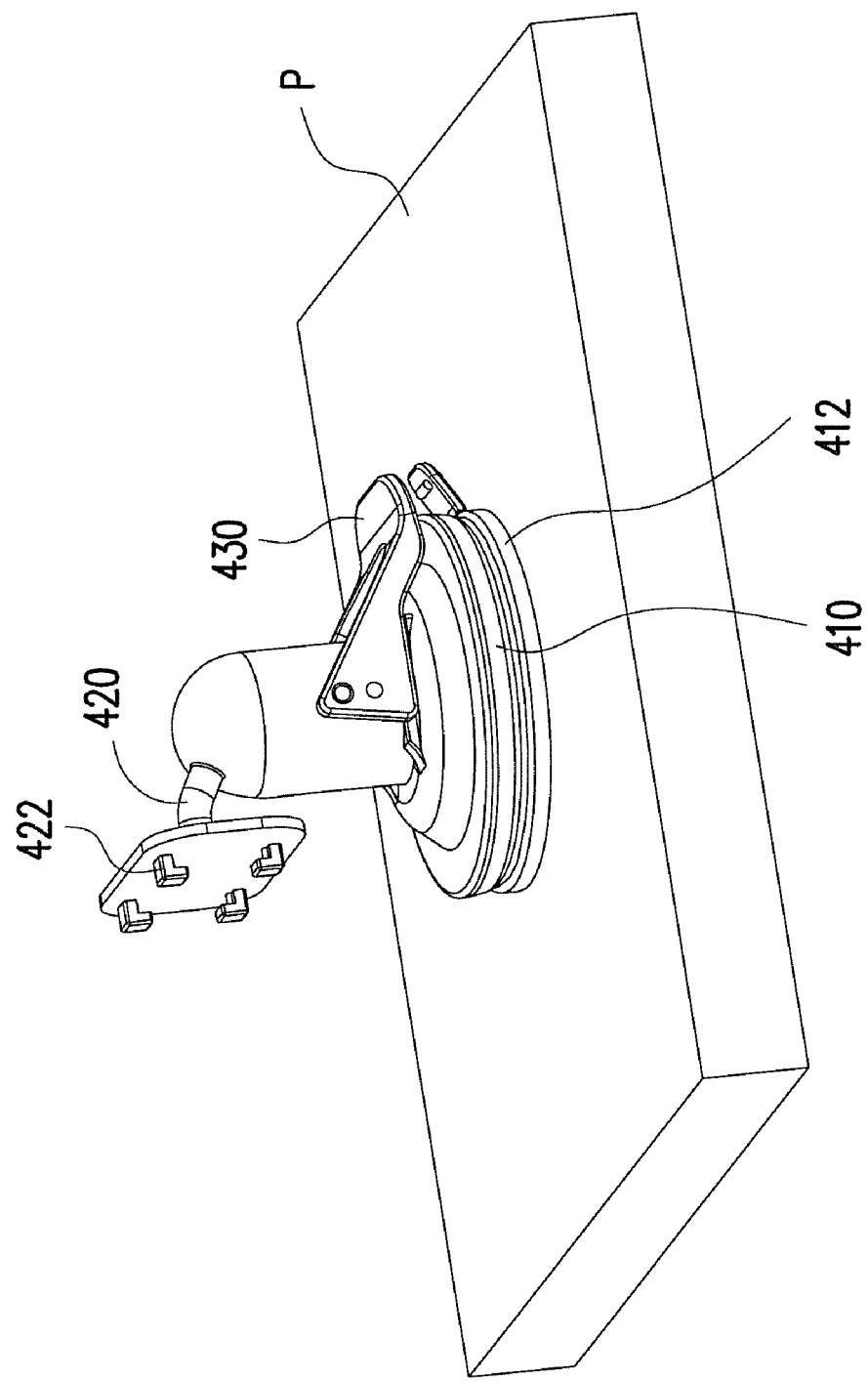
FIG. 9A is a schematic view illustrating a pedestal and a connecting bar bonded together.
Figure 9B:
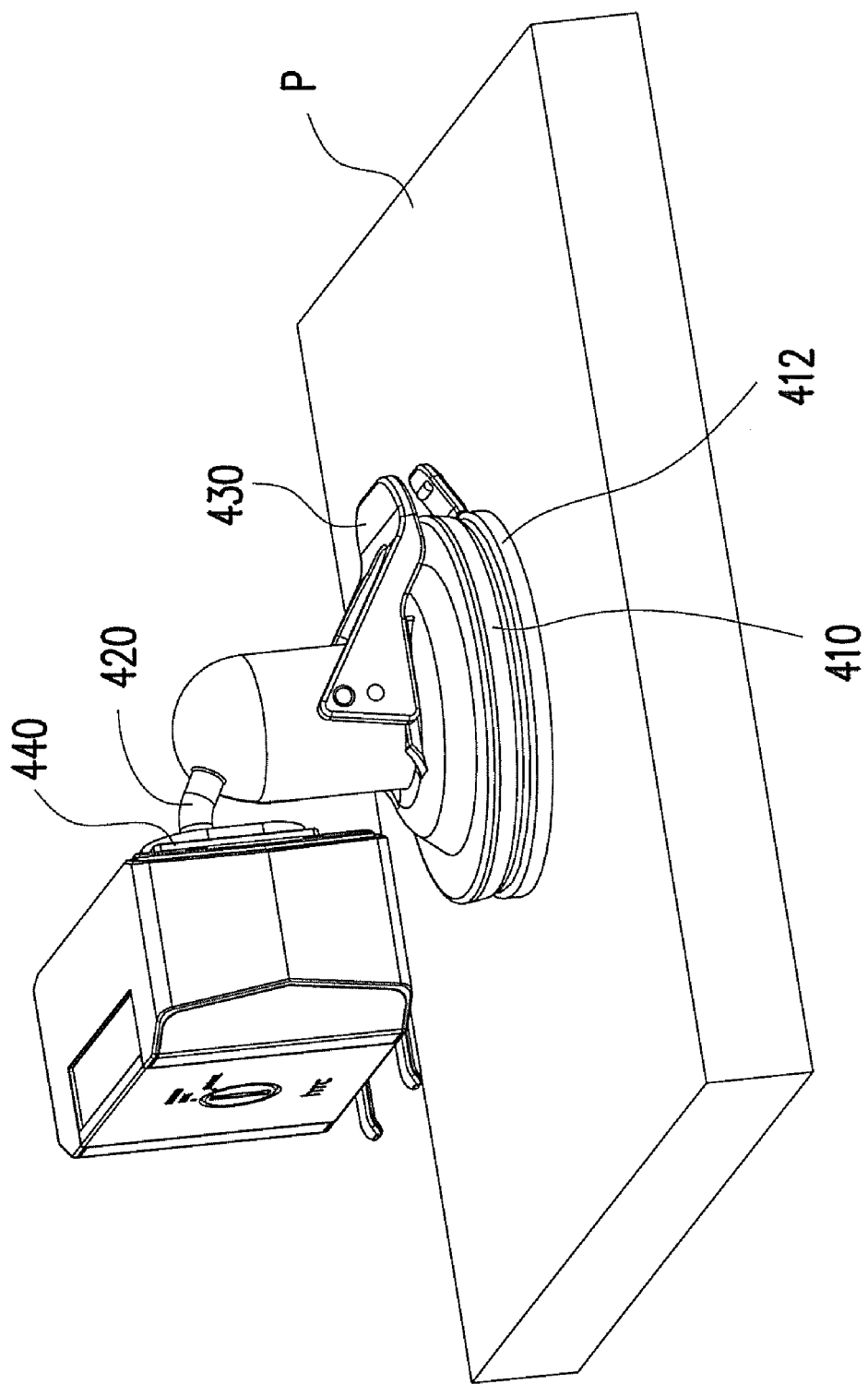
FIG. 9B is a schematic view illustrating the entire holder reliably fixed onto an object.

Moreover, the holder of the present invention can further include a pedestal, a connecting bar, and so on, such that the holder and the handheld electronic apparatus clamped thereby can be reliability fixed onto other objects by means of the pedestal and the connecting bar. To be more specific, as shown in FIGS. 9A and 9B, a holder 400 includes not only the aforesaid components but also a pedestal 410 and a connecting bar 420 according to another embodiment of the present invention Here, FIG. 9A is a schematic view illustrating the connecting bar 420 and the pedestal 410 bonded together. FIG. 9B is a schematic view illustrating the entire holder 400 reliably fixed onto an object P. Referring to FIGS. 9A and 9B, in the present embodiment, the pedestal 410 has a sucking device capable of being attached to a surface of the object P. The object P herein refers to a windshield or an article-placing stand. Note that the holder 400 can have a handle 430. When the pedestal 410 is attached to the object P, the handle 430 can be drawn, such that the sucking device 412 can be reliably attached onto the object P because of the movement of the handle 430. Certainly, in other embodiments of the present invention, the pedestal 410 can also be bonded to the object P through other possible ways, for example, by screw mounting or structural fitting.

The connecting bar 420 is located between the pedestal 410 and the base 440. Additionally, the connecting bar 420 has a bonding member 422 which can be connected to the base 440. As indicated in FIG. 9A, the bonding member 422 is, for example, a hook, and the base 440 has a trench (not shown) corresponding to the bonding member 422. Therefore, the base 440 and the bonding member 422 can be bonded together. It is certain that the manner in which the base 440 and the connecting bar 420 are connected is not limited in the present application, and the bonding member 422 is not restricted to be the hook. According to other embodiments of the present application, the base 440 and the connecting bar 420 can be connected together in other appropriate ways. Moreover, in the present embodiment, the connecting bar 420 is flexible, such that a user is allowed to adjust the handheld electronic apparatus to be located at an appropriate position.

To sum up, in comparison with the conventional holder, the holder of the present application can reliably hold handheld electronic apparatuses with different widths, thicknesses, and dimensions. Additionally, the holder of the present application can be operated in a simple and fast manner, thereby giving rise to an increase in the convenience of use. In addition, the connecting rods, the elastic modules, and the push-push type mechanism are accommodated in the holder according to the present apparatuses. Thereby, simplicity and artistry-featuring look of the holder can be ensured.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A holder for holding a handheld electronic apparatus, the holder comprising:
   a base;
   a first carriage disposed on the base and having an accommodation space for placing the handheld electronic apparatus;
   a first elastic module contacting the first carriage and the base for driving the first carriage moving with respect to the base along a disposition direction;
   a second carriage disposed in the accommodation space;
   a second elastic module contacting against the second carriage and the first carriage for driving the second carriage moving with respect to the first carriage along the disposition direction; and
   two clamping mechanisms disposed on the base and located at two respective sides of the accommodation space, wherein each of the two clamping mechanisms respectively interferes with the first carriage, a portion of each of the two clamping mechanisms moves toward the accommodation space for holding the handheld electronic apparatus when the first carriage moves toward the base, and a moving direction of the portion of each of the two clamping mechanisms is substantially perpendicular to a moving direction of the first carriage.

2. The holder as claimed in claim 1, wherein each of the two clamping mechanisms comprises a block and a connecting rod, the two blocks being slidably disposed on the base and located at the two respective sides of the accommodation space, the two connecting rods being disposed on the base and located at the two respective sides of the accommodation space, each of the two connecting rods interfering with the first carriage and one of the two blocks, such that when the first carriage moves toward the base, one of the two blocks is correspondingly driven and moves toward the accommodation space to clamp the handheld electronic apparatus.

3. The holder as claimed in claim 2, each of the two connecting rods being respectively connected to the base at a pivot and having a first end and a second end located at two respective sides of the pivot, the first end of each of the two connecting rods leaning against one of the two blocks respectively, the second end of each of the two connecting rods being located at a movement path of the first carriage, wherein the first carriage leans against the second ends of the two connecting rods when the first carriage moves toward the base at a position, and the first ends of the two connecting rods are driven to correspondingly push the two blocks, such that the two blocks are protruded into the accommodation space to clamp the handheld electronic apparatus.

4. The holder as claimed in claim 2, further comprising a third elastic module disposed between the two blocks and the two connecting rods.

5. The holder as claimed in claim 4, wherein the third elastic module comprises two third spring sets respectively disposed between each of the two blocks and one of the two connecting rods corresponding thereto.

6. The holder as claimed in claim 1, further comprising a push-push type mechanism disposed on the base and interfering with the first carriage.

7. The holder as claimed in claim 6, wherein the push-push type mechanism comprises two push-push type switches located at the two respective sides of the accommodation space.

8. The holder as claimed in claim 7, wherein the first carriage has a protrusion located at each of the two respective sides thereof for interfering with one of the two push-push type switches.

9. The holder as claimed in claim 8, wherein each of the two push-push type switches has a hook for being engaged with the protrusion of the first carriage corresponding thereto.

10. The holder as claimed in claim 1, further comprising:
    a rotating member pivotably disposed on the second carriage; and
    a supporting member connecting the rotating member, wherein the supporting member is selectively driven by the rotating member and leans between the first carriage and the second carriage.

11. The holder as claimed in claim 10, wherein the supporting member comprises a plurality of supporting pillars located between the first carriage and the second carriage, the rotating member comprises a rotary disc connecting the plurality of supporting pillars, and the first carriage has a plurality of holes corresponding to the plurality of supporting pillars for allowing the plurality of supporting pillars to be inserted into the plurality of holes.

12. The holder as claimed in claim 1, further comprising:
    a pedestal; and
    a connecting bar connecting between the pedestal and the base.

13. The holder as claimed in claim 12, wherein the pedestal comprises a sucking device.

14. The holder as claimed in claim 12, wherein the connecting bar is flexible.

15. The holder as claimed in claim 1, wherein the first elastic module comprises at least a first spring disposed between the first carriage and the base.

16. The holder as claimed in claim 1, wherein the second elastic module comprises at least a second spring disposed between the second carriage and the first carriage.

* * * * *